United States Patent [19]
Ament et al.

[11] Patent Number: 5,961,172
[45] Date of Patent: Oct. 5, 1999

[54] CARGO SPACE COVERING FOR A MOTOR VEHICLE

[75] Inventors: Eduard Ament, Aichwald; Holger Seel, Aidlingen, both of Germany

[73] Assignee: Baumeister & Ostler GmbH & Co., Aichwald/Aichschiess, Germany

[21] Appl. No.: 08/861,936

[22] Filed: May 22, 1997

[30] Foreign Application Priority Data

May 24, 1996 [DE] Germany .............................. 196 21 009

[51] Int. Cl.$^6$ ..................................................... B60R 5/04
[52] U.S. Cl. .................. 296/37.16; 160/238; 160/323.1; 160/903
[58] Field of Search ................................. 296/37.16, 98; 160/238, 250, 24, 323.1, 903

[56] References Cited

U.S. PATENT DOCUMENTS

| | | | |
|---|---|---|---|
| 4,168,094 | 9/1979 | Yagi | 296/37.16 |
| 4,222,601 | 9/1980 | White et al. | 296/37.16 |
| 4,480,675 | 11/1984 | Berkemeier | 296/37.16 |
| 4,671,557 | 6/1987 | Lemp | 296/37.16 |
| 5,224,748 | 7/1993 | Decker et al. | 296/37.16 |
| 5,584,523 | 12/1996 | Kawaguchi | 296/37.16 |
| 5,676,415 | 10/1997 | Ament et al. | 296/37.16 |

FOREIGN PATENT DOCUMENTS

| | | |
|---|---|---|
| 2941711A1 | 4/1980 | Germany . |
| 4414397C2 | 11/1995 | Germany . |
| 4441260A1 | 5/1996 | Germany . |

OTHER PUBLICATIONS

Office Action Jan. 1997 Germany.

*Primary Examiner*—Joseph D. Pape
*Attorney, Agent, or Firm*—Evenson, McKeown, Edwards & Lenahan, PLLC

[57] ABSTRACT

A cargo space covering is provided which has axially movable lateral housing parts for the fastening in vehicle-fixed holding devices. A locking device is assigned to at least one lateral housing part, which locking device, when the locking position of the lateral housing part is reached, can be changed from an inoperative position into an operative position in which the locking device exercises an additional retaining force onto the lateral housing part relative to the longitudinal axis of the housing which supplements the spring force.

20 Claims, 2 Drawing Sheets

CARGO SPACE COVERING FOR A MOTOR VEHICLE

BACKGROUND AND SUMMARY OF THE INVENTION

This application claims the priority of German application 196 21 009.7, the disclosure of which is expressly incorporated by reference herein.

The invention relates to a cargo space covering for a motor vehicle having two lateral housing parts which are mutually assigned coaxially with respect to a longitudinal axis of the housing, for receiving a bearing shaft for a plane structure which can be wound onto it and unwound from it, the lateral housing parts being fastenable in the area of their exterior end faces in vehicle-fixed holding devices with at least one lateral housing part being pressable by spring force axially toward the outside from a release position releasing the vehicle-fixed holding devices into a locking position fastened in the vehicle-fixed holding devices.

Such a cargo space covering is known from German Patent Document DE 29 41 711 A1. The known cargo space covering has two cup-type lateral housing parts which can be fixed on their respective exterior ends by means of holding pins for the fastening in one corresponding, vehicle-fixed holding recess respectively. The opposite vehicle-fixed holding recesses are positioned in the cargo space of the motor vehicle such that, with its longitudinal housing axis, to which the lateral housing parts are aligned coaxially, the cargo space covering extends horizontally and transversely to the longitudinal direction of the vehicle along the width of the cargo space. In order to insert the cargo space covering between the vehicle-fixed holding devices and to release it again from them, at least one of the two lateral housing parts is held in a spring-loaded linearly movable manner coaxially with respect to the longitudinal axis of the housing. For inserting the cargo space covering in the vehicle-fixed holding devices, the movably held lateral housing part is in a simple manner pressed toward the inside along the longitudinal axis of the housing against a spring force, which reduces the spacing of the opposite exterior ends of the two lateral housing parts with respect to one another. Thus, the whole length of the housing of the cargo space covering is also reduced to an amount which is smaller than the distance of the vehicle-fixed holding devices with respect to one another so that the housing can be aligned in a simple manner with respect to the vehicle-fixed holding devices. Subsequently, the loading of the movable lateral housing part is removed in a simple manner whereby, because of the spring loading, the lateral housing part is pressed toward the outside. As a result, the housing of the cargo space covering is centered and fastened in the vehicle-fixed holding devices in that the respective holding pins on the exterior ends of the lateral housing parts are pressed into the holding recesses of the vehicle-fixed holding devices. The securing of the cargo space covering therefore takes place exclusively by way of the spring force axially affecting the lateral housing parts. For a releasing of the cargo space covering from the vehicle-fixed holding devices, the lateral housing part is simply pressed manually against the spring force axially toward the inside and the housing is removed from the vehicle-fixed holding devices. In the case of a side impact onto the motor vehicle, it is possible that the corresponding side impact load presses the lateral housing part adjoining the loaded side against the spring force inside the housing out of the vehicle-fixed holding device, whereby the cargo space covering may be thrown in an uncontrolled manner through the vehicle interior. Injuries to vehicle occupants as a result of the released cargo space covering cannot be excluded It is an object of the invention to provide a cargo space covering of the initially mentioned type in the case of which, particularly with respect to side impact loads onto a motor vehicle provided with the cargo space covering, injuries to vehicle occupants caused by the cargo space covering are at least reduced.

This object is achieved according to preferred embodiments of the invention in that a locking device is assigned to the at least one lateral housing part, which locking device, when the locking position of the lateral housing part is reached, can be changed from an inoperative position into an operative position in which the locking device exercises an additional retaining force on the lateral housing part relative to the longitudinal axis of the housing which supplements the spring force. If both lateral housing parts are arranged in a spring-loaded linearly movable manner, a separate locking device is arranged for each lateral housing part, which separate locking devices can, however, be changed only jointly into their operative position and into their inoperative position. In this case, the locking device can exercise the required additional axial retaining force by a corresponding form closure as well as by a frictional connection. In the case of a particularly simply constructed embodiment, the change of the locking device from its inoperative position into the operative position exercising the retaining force can be carried out in a simple manner by the manual operation of a corresponding operating button, operating lever or similar device after the housing of the cargo space covering, by means of the pressing toward the outside of the lateral housing part, has reached its locking position between the vehicle-fixed holding devices which represents the installed position. As will be explained in the following, however, it is also possible to achieve an automatic forced locking by the locking device such that the locking device is automatically changed into the operative position during the axial movement of the lateral housing part toward the outside no later than at the point in time at which the housing of the cargo space covering has taken up its locking position within the vehicle-fixed holding devices. By means of the additional retaining force, side impact loads onto the vehicle can be compensated without any release of the cargo space covering from its vehicle-fixed holding devices.

As a further development of the invention, forced coupling devices are assigned to the locking device by means of which the locking device, during an axial movement of the lateral housing part toward the outside when the locking position in the vehicle-fixed holding devices is reached, can automatically be changed into the operative position. In this case, it is possible to provide corresponding kinematic mechanisms or spring-loaded detent pawl mechanisms. If a universally usable cargo space covering is provided which can be fixed in vehicle-fixed holding devices of different vehicle types which have different distances from one another, the locking positions of the lateral housing part relative to the longitudinal axis of the housing may also be arranged at different axial heights. Preferably the locking device including its forced coupling device is designed to be variable in such a manner that—irrespective of the axial height at which the locking position of the lateral housing part is reached—, it is forcibly guided into its operative position in any case so that the locking device can be used in the same manner universally for different vehicle types cargo space coverings.

In a further development of the invention, the forced coupling devices are in an operative connection with a manually detachable blocking device for fastening the lateral housing part in the release position releasing the vehicle-fixed holding devices relative to the longitudinal axis of the housing. The locking device according to the invention for locking the cargo space covering in its position fastened in the vehicle-fixed holding devices is expediently combined in this further development with a blocking device which fixes the movable lateral housing part in the release position, as described in detail in German Patent Document P 44 41 260.6-22 which is no prior publication. A corresponding U.S. application under Ser. No. 08/559,882 was filed in the USPTO on Nov. 20, 1995now U.S. Pat. No. 5,676,415, issued Oct. 14, 1997. As a result, a simplified mounting of the cargo space covering as well as an additional securing in its mounted condition is achieved.

In a further development of the invention, the locking device has devices for increasing the frictional connection between the movable lateral housing part and a part of the cargo space covering arranged stationarily with respect to the longitudinal axis of the housing. In this further development, particularly brake shoes may be provided which increase the frictional engagement between the movable lateral housing part and the stationary part of the cargo space covering in the locking position of the lateral housing part.

In a further development of the invention, the locking device has a detent arrangement which achieves a form closure between the movable lateral housing part and a part of the cargo space covering which is arranged stationarily with respect to the longitudinal axis of the housing. The achieving of a form closure provides by means of simple devices an extremely stable additional securing of the movable lateral housing part in its locking position.

In a further development of the invention, the detent arrangement has at least one spring-loaded movable detent element and, as a counterpart, a row of mutually adjoining detent points which extends along the longitudinal axis of the housing, which detent points are assigned to the lateral housing part, on the one hand, and to the stationary part of the cargo space covering, on the other hand. By means of the row of mutually adjoining detent points which extends along the longitudinal axis of the housing, it is possible to change the detent arrangement in different axial locking positions of the lateral housing part—depending on the dimensions of the respective vehicle-fixed holding devices—into its operative position and thus into its locking position. If this development is combined with the previously described forced coupling devices, an automatic locking takes place in the manner of a self-adjusting adaptation, depending on the axial position in which the locking position of the lateral housing part is reached.

In a further development of the invention, the spring-loaded movable detent element and/or the detent points are designed such that, during an axial movement of the lateral housing part relative to the longitudinal axis of the housing, the detent arrangement runs free toward the outside and, with the start of a reverse axial movement reaches a detent position which represents the operative position. In a particularly advantageous fashion, this further development has corresponding run-on bevels on the detent element or on the detent points which permit the sliding past one another of detent elements and detent points during the axial movement of the lateral housing part toward the outside. However, simultaneously, the opposite flanks of the detent elements or detent points must be constructed at a right angle with respect to the longitudinal axis of the housing such that, even at the start of the reverse axial movement, a form-locking reaching behind the respective detent flanks will occur.

Other objects, advantages and novel features of the present invention will become apparent from the following detailed description of the invention when considered in conjunction with the accompanying drawings.

DETAILED DESCRIPTION OF THE DRAWINGS

Figure 1:
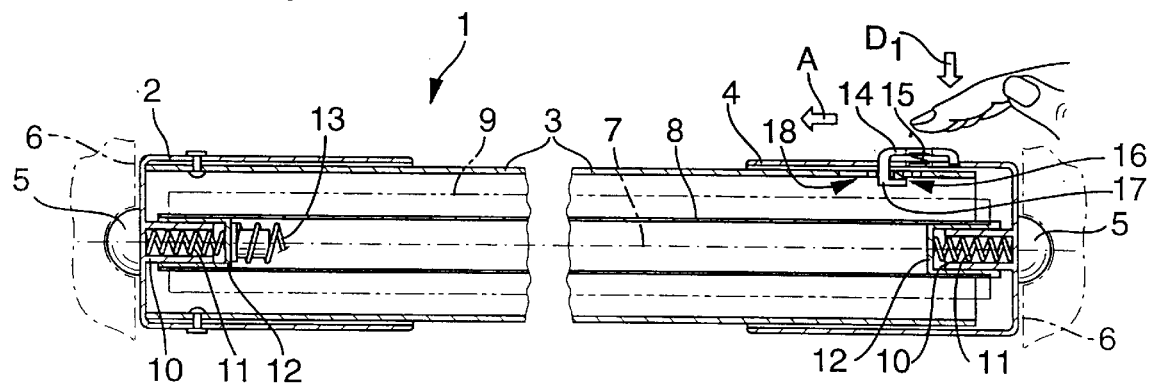
FIG. 1 is a sectional view of an embodiment of a cargo space covering according to the invention in its locking position fastened in vehicle-fixed holding devices.

A cargo space covering 1 according to FIGS. 1 to 5 has a housing 2, 3, 4 in which, in a manner described in detail in the following, a window-shade-type shaft 8 for the winding and unwinding holding of a textile plane structure in the form of a window-shade-type plane 9 is disposed so that it can be rotated about a longitudinal axis 7 of the housing. The housing 2, 3, 4 of the cargo space covering 1 includes a housing part in the form of a cup-shaped lateral part 2 which is stationary with respect to the longitudinal housing axis 7 and a cassette sleeve 3. The cup-shaped lateral part 2 coaxially reaches over the cassette sleeve 3 at an end of the housing and being fixed on it by means of rivets R. On its outer end, the lateral part 2 has a fixing pin 5 which projects to the outside and can be placed in a corresponding recess of a vehicle-fixed holding device 6.

On the side of the cassette sleeve 3 opposite the lateral part 2, another cup-shaped lateral part 4 is provided which coaxially reaches over the cassette sleeve 3 from the opposite side in a corresponding reverse manner with respect to the lateral part 2. The lateral part 4 also is provided with a fixing pin 5 on its exterior end which fixing pin 5 can be fastened in a corresponding recess of a vehicle-fixed holding device 6 on the opposite side of a cargo space. The two opposite vehicle-fixed holding devices 6 are each part of two mutually opposite side walls of the cargo space and of the vehicle interior. In the mounted condition of the cargo space covering 1, in which it is fixed in the vehicle-fixed holding devices 6, it therefore extends transversely to the longitudinal direction of the vehicle horizontally along the width of the cargo space and of the vehicle interior.

In contrast to the opposite lateral part 2, the cup-shaped lateral part 4 is axially slidably relative to the longitudinal axis 7 of the housing on the outer jacket of the cassette housing 3. For the bearing of the window-shade-type shaft 8 inside the housing, two bearing journals 10 project coaxially with respect to the longitudinal axis 7 of the housing 7 from the interior sides of the front walls of the two lateral parts 2 and 4 toward the inside and have a sleeve-shaped design. By means of two cup-shaped bearing sleeves 12, the window-shade-type shaft 8 is slidably disposed on these bearing journals 10, the bearing sleeves 12 being pushed coaxially over the bearing journals 10 and being fixedly connected with the window-shade-type shaft 8 on the opposite ends of this window-shade-type shaft 8 which also has a sleeve-shaped design. The bottoms of the bearing sleeves 12 form supports for one pressure spring 11 respectively which are designed as coil springs and are supported by means of their opposite end on the front wall of the respective lateral part 2, 4. Both pressure springs 11 have an identical design, providing a floating mounting for the window-shade-type shaft 8 such that, independently of the respective axial position of the lateral part 4 described in detail in the following, the window-shade-type shaft 8 will always be situated in the center inside the housing 2, 3, 4. In the interior of the window-shade-type shaft 8 a torsion spring 13 is also arranged which is used as a recuperating spring for the automatic winding-up of the window-shade-type plane 9.

The two pressure springs 11 are arranged to be operative in series so that the resulting pressure force of the two pressure springs 11 exercises a pressure load on the lateral part 4 which acts axially to the outside relative to the longitudinal axis 7 of the housing. This spring force has the purpose of pressing the fixing pins 5 of the two lateral housing parts 2, 4 into the vehicle-fixed holding devices 6 and thus achieving the locking position of the housing of the cargo space covering 1. In this case, the joint spring force of the pressure springs 11 is selected to be only so high that the lateral part 4 can be manually pressed against this spring force toward the inside, whereby the fixing pins 5 can be taken out of the recesses of the vehicle-fixed holding devices 6.

In order to facilitate the mounting of the cargo space covering 1 in the vehicle-fixed holding devices 6, a manually releasable blocking device 14, 17 is assigned to the axially movable lateral part 4, which blocking device 14, 17 fixes the lateral part 4 in a release position relative to the cassette sleeve 3 and relative to the longitudinal axis 7 of the housing in which the lateral part 4 is manually pressed toward the inside against the resulting spring force of the pressure springs 11 to an interior end stop (FIGS. 2 and 4) in the direction of the arrow (A) and thus has an axial length which is reduced with respect to the locking position.

This manually releasable blocking device 14, 17 corresponds with respect to its operating principle to a blocking device described in detail in the above-mentioned German Patent Document P 44 41 260.6-22 (corresponding U.S. application Ser. No. 08/559,882, filed on Nov. 20, 1995 now U.S. Pat. No. 5,676,415, issued Oct. 14, 1997). For a detailed description, reference is therefore made to this patent application. This blocking device 14, 17 has an operating head 14 which is disposed in a corresponding recess on the top side of the lateral part 4, in which case it can be pressed in or out in a vertical moving direction ($D_1$, $D_2$). By means of a pressure spring 15, the operating head 14 is disposed in the recess of the lateral part 4, the pressure spring 15 exercising a pressure load toward the outside in the direction of the arrow ($D_2$) onto the operating head 14. On a front side pointing to the front wall of the lateral part 4, the operating button 14 has an open design as the result of a slot 21 which creates a C-shaped profile for the operating button together with an upper and a lower leg. In the top side of the cassette sleeve 3, another recess is provided which is adapted to the dimensions of the operating button 14.

The slot 21 has a height which corresponds at least to the thickness of the wall of the cassette sleeve 3 so that the operating button 14 has an approximately C-shaped profile.

Figure 2:
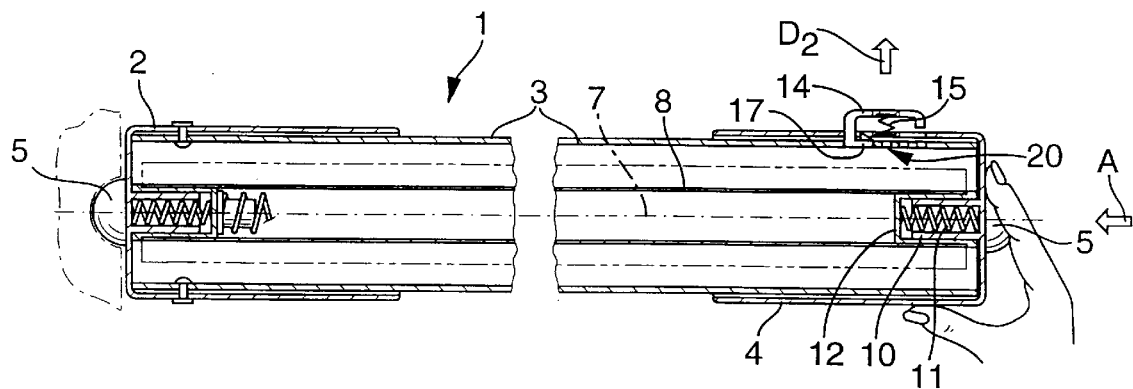
FIG. 2 is another sectional view of the cargo space covering according to FIG. 1 but in its release position pushed together to a smaller axial length.
Figure 4:
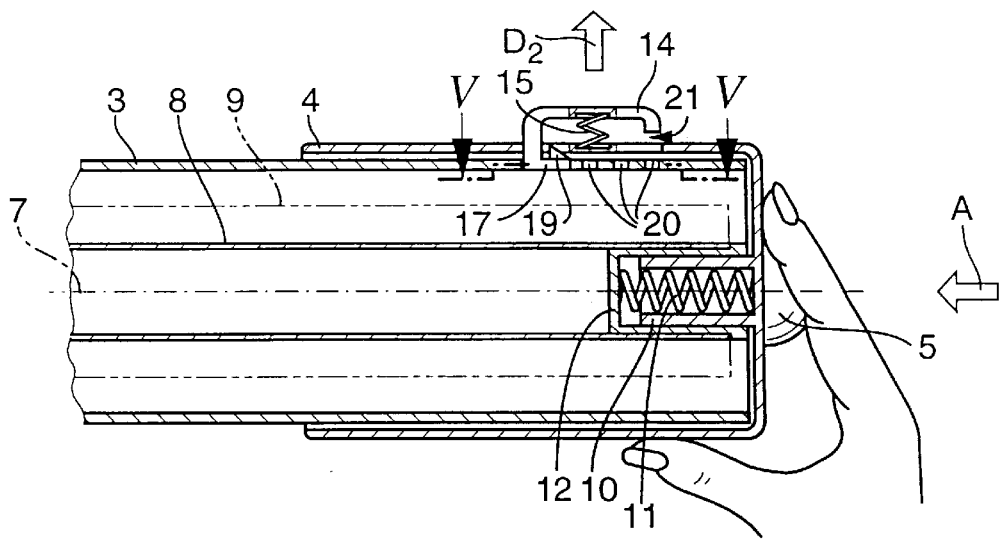
FIG. 4 is a sectional representation of the cargo space covering according to FIG. 3 in which the axially movable lateral housing part is in its release position relative to the stationary lateral parts.

In the release position of the cargo space covering 1 according to FIGS. 2 and 4, the two recesses in the cassette sleeve 3 and the lateral part 4 are aligned such with respect to one another that the operating button 14 can be pressed upwards by the spring force of the pressure spring 15. In its upper end position, a lower leg of the operating button 14, which is not shown in the drawings, is supported on an edge of the recess in the cassette sleeve 3 so that the lateral part 4 is locked in this position relative to the cassette sleeve 3. As soon as the operating button 14 is now manually pressed downward in the direction of the arrow ($D_1$), the slot 21 of the operating button 14 arrives in an alignment with this edge of the recess of the cassette sleeve 3 which had previously blocked the lower leg of the operating button. As a result, the blocking is lifted because the lateral part 4 can now axially be moved toward the outside by the spring force of the pressure springs 11 until a rear-side end stop of the operating button 14 again comes to stop against the edge of the recess in the cassette sleeve 3. In this position, the outer end position of the lateral part 4 is reached. For another axial pressing toward the inside of the lateral part, with respect to only the blocking device, it is sufficient to press the lateral part 4 against the spring force of the pressure springs 11 again toward the inside until the two recesses in the lateral part 4 and the cassette sleeve 3 are aligned with one another, whereby the operating button 14 is automatically pressed upward back into its locking position.

Figure 5:
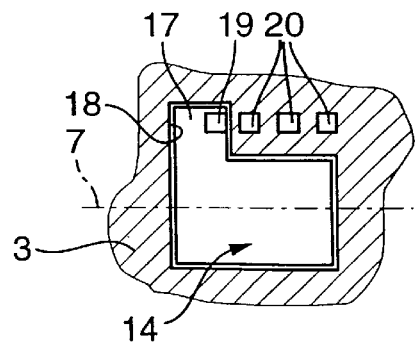
FIG. 5 is an enlarged cutout of the cargo space covering according to FIG. 4 at the level of a fastening button along an intersection line V—V.

However, in the shown embodiment, a locking device according to the invention in the form of a detent arrangement is also assigned to the manually releasable blocking device in the form of the operating button 14, which detent arrangement, in a locking position of the cargo space covering 1 in the vehicle-fixed holding devices 6, causes a form-locking blocking which acts in addition to the spring force of the pressure spring 11. For this purpose, as a lateral extension of the lower leg of the operating button 14—in the illustrated embodiment, perpendicularly to the plane of the drawing—, a horizontal detent lengthening 17 is assigned which projects freely in the axial direction to the outside and to the side away from the operating button 14 and has on its top side a detent tooth 19 which is molded on in one piece (FIG. 5). The detent tooth 19 is provided with a run-on bevel in the axial direction toward the outside. On its rear-side tooth profile, the detent tooth 19 is stepped perpendicularly downward and thus at a right angle to the longitudinal axis 7 of the housing. In an axial alignment with this detent tooth 19 and therefore also laterally offset with respect to the rear-side vertical stop web of the operating button 14, three detent points 20 arranged axially behind one another at uniform distances are provided as a detent hole row in the top side of the cassette sleeve 3. Axially within the detent points 20, the top side of the cassette sleeve 3 is also provided with a recess lengthening 18 which is laterally offset analogously to the detent lengthening of the operating button 14, the dimensions of the recess continuation 18 being adapted such to the dimensions of the detent lengthening 17 that the detent lengthening 17 can be pressed with play vertically through the recess continuation 18. The length of the detent hole row 20 is coordinated such with the maximal axial movement stroke of the lateral part 4 that several detent steps are formed between the release position of the lateral part 4 and its exterior axial end position. The positioning of the detent arrangement 17, 19, 20 used as the locking device in a laterally offset manner to the operating button 14 used as the blocking device is illustrated in FIG. 5, in which case the detent lengthening 17 represents a lateral lengthening of the lower leg of the operating button 14 which is not shown in detail.

Figure 3:
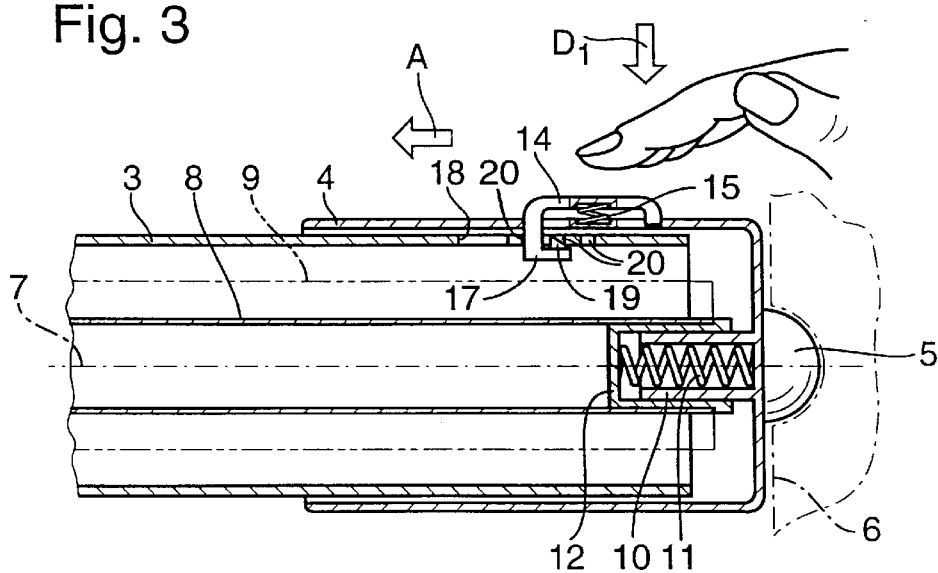
FIG. 3 is an enlarged sectional representation of a partial area of the cargo space covering according to FIG. 1 at the level of a lateral housing part which can be axially moved with respect to the remaining housing.

The method of operation of the locking device 17, 18, 19, 20 is coupled in a simple manner to the function of the operating button 14. In order to release the lateral part 4 from its release position according to FIG. 2 for an axial movement, the operating button 14 is pressed downward in a simple manner, whereby the detent lengthening 17 is also pressed downward through the recess continuation 18. The lateral part 4 can now be pressed freely by means of the spring force of the pressure spring 11 axially toward the outside. Since the manual release of the operating button 14 expediently takes place not before the fixing pins 5 are in an axial alignment with the recesses of the vehicle-fixed holding device 6, the lateral housing part 4 is now pressed axially toward the outside until the two fixing pins 5 of both lateral parts 2 and 4 are pressed into the recesses of the vehicle-fixed holding devices 6. During the axial movement of the lateral part 4 toward the outside, the front tooth profile of the detent tooth 19, which is designed as a run-on bevel, slides over the detent holes 20. As soon as the locking position of the lateral part 4 has been reached, the operating button 14 is again pressed upward by means of the pressure spring 15, whereby the detent tooth 19 is pressed upward to the level of the respective assigned detent hole 20 and engages in this detent hole (FIG. 3). Since the vertical rear-side tooth profile of the detent tooth 19 reaches behind the edge of the detent hole 20 in a stable manner, a form-locking blocking for the cup-shaped lateral part 4 is achieved in this locking position. Also in the case of higher loads onto the front wall of the lateral part 4 resting against the vehicle-fixed holding device 6, no axial movement therefore takes place of the lateral part 4 and therefore also no release from the vehicle-fixed holding devices 6 because the form-locking blocking by the detent tooth 19 exercises a retaining force which is significantly increased with respect to the resulting spring force of the pressure springs 11. In order to be able to demount the cargo space covering 1 again, the locking between the detent tooth 19 and the pertaining detent point 20 must be released in that the operating button 14 is manually pressed downward in the direction of the arrow ($D_1$) and simultaneously the lateral part 4 is displaced toward the inside until the release position of the lateral part 4 is reached in which the operating button 14 is pressed toward the outside into its blocking position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cargo space covering for a motor vehicle comprising:
    two lateral housing parts which are mutually arranged at least at end areas of a housing coaxially with respect to a housing longitudinal axis of the housing, and
    a bearing shaft in said housing for bearing a planar structure which can be wound and unwound with respect to the longitudinal axis,
    wherein the lateral housing parts are fastenable at respective axial exterior ends in vehicle-fixed holding devices with at least one of the lateral housing parts being pressable axially by means of an axial spring arranged in the bearing shaft and exerting a spring force acting axially toward an outside relative to the longitudinal axis of the housing from a release position releasing the vehicle-fixed holding devices into a locking position fastened in the vehicle-fixed holding devices, and
    wherein a locking device is assigned to at least one of the lateral housing parts such that when the locking position of the respective lateral housing part has been reached, the locking device can be moved from its inoperative position into an operative position in which the locking device exercises an additional retaining force onto the lateral housing part relative to the longitudinal axis of the housing which supplements the spring force of the axial spring.

2. Cargo space covering according to claim 1, wherein the locking device includes forced coupling devices for automatically changing the locking device into the operative position when the locking position is reached in the vehicle-fixed holding devices during axial movement of the housing parts.

3. Cargo space covering according to claim 2, wherein the forced coupling devices are connected with a manually releasable blocking device for fastening the lateral housing part in the release position releasing the vehicle-fixed holding devices relative to the longitudinal axis of the housing.

4. Cargo space covering according to claim 1, wherein the locking device is operable to increase the frictional connection between the movable lateral housing part and a part of the cargo space covering which is arranged stationarily with respect to the longitudinal axis of the housing.

5. Cargo space covering according to claim 1, wherein the locking device has a detent connection between the one of the movable lateral housing parts and a part of the cargo space covering which is arranged stationarily with respect to the longitudinal axis of the housing.

6. Cargo space covering according to claim 5, wherein the detent arrangement has at least one spring-loaded movable detent element and, as a counterpart, has a row of adjacent detent points which extend along the longitudinal axis of the housing and which are disposed in an area adjacent the lateral housing part on the stationary part of the cargo space covering.

7. Cargo space covering according to claim 6, wherein one of the spring-loaded movable detent element and the detent points are designed such that, during an axial movement of one of the lateral housing parts relative to the longitudinal axis of the housing, the detent element is movable freely along the outside of one of the housing parts and, with the start of a reverse axial movement, reaches a detent position which represents the operative position.

8. Cargo space covering according to claim 1, wherein the locking device can be changed by means of a manually operable unlocking from the operative position into its inoperative position.

9. A cargo space covering arrangement for a vehicle, comprising:
    a bearing shaft which in use supports a flexible flat cover member wound thereon,
    lateral housing parts supporting the bearing shaft at respective opposite axial ends of the bearing shaft,
    said lateral housing parts being axially movable with respect to one another and being continuously resiliently biased away from one another by at least one resilient member to accommodate selective installation and removal of said housing parts from vehicle borne holding devices,
    and a selectively engageable locking device operable to provide an axial holding force on said at least one lateral housing part, which holding force is separate from and in addition to axial holding forces from said at least one resilient member and positively locks said lateral housing part in an installed position of the cargo space covering with respect to the vehicle borne holding devices.

10. A cargo space covering arrangement according to claim 9, wherein the locking device has a detent arrangement which achieves a detent connection between one of the movable lateral housing parts and a part of the cargo space covering arrangement which is arranged stationarily with respect to the lateral housing parts.

11. A cargo space covering arrangement according to claim 10, wherein the detent arrangement has at least one spring-loaded movable detent element and, as a counterpart, has a row of adjacent detent points which extend along the longitudinal axis of the part of the cargo space covering arrangement which is stationary.

12. A cargo space covering arrangement according to claim 11, wherein the spring-loaded movable detent element and the detent points are designed such that, during an axial movement of one of the lateral housing parts relative to the longitudinal axis of the housing parts, the detent element being freely moveable on the outside of one of the housing parts and, with the start of a reverse axial movement, reaches a detent position which represents the operative position.

13. A cargo space covering arrangement according to claim 12, wherein the locking device can be changed by means of a manually operable unlocking from the operative position into its inoperative position.

14. A cargo space covering arrangement according to claim 9, wherein the locking device includes a movable detent element carried by one of the lateral housing parts and a detent point carried by a stationary part, said detent element being selectively engageable in said detent point.

15. A cargo space covering arrangement according to claim 14, comprising a spring continuously acting on the detent element.

16. A cargo space covering arrangement according to claim 9, wherein said selectively engageable locking device includes a radially movable detent element carried by one of the lateral housing parts and at least one detent point on a stationary part, said detent element being engaged in said detent point.

17. A cargo space covering arrangement according to claim 16, comprising a spring which continuously biases the detent element toward its operative locking position.

18. A cargo space covering arrangement according to claim 17, comprising a manually engageable blocking device connected with the detent element and operable to facilitate manual movement of the detent element out of the locking position so that the housing parts can be axially moved relative to one another against the force of the at least one resilient member.

19. A cargo space covering arrangement according to claim 16, wherein a plurality of axially spaced detent points are provided to accommodate locking of the lateral and stationary housing parts together at different axial lengths of a housing formed thereby.

20. A cargo space covering arrangement according to claim 19, comprising a manually engageable blocking device connected with the detent element and operable to facilitate manual movement of the detent element out of the locking position so that the housing parts can be axially moved relative to one another against the force of the at least one resilient member.

* * * * *